(12) United States Patent
Scanlan et al.

(10) Patent No.: US 6,644,349 B2
(45) Date of Patent: Nov. 11, 2003

(54) IN-TANK WATER CONDITIONER VALVE

(75) Inventors: John Scanlan, deceased, late of Libertyville, IL (US), by Anne Scanlan, legal representative; Bradley Martin, Gurnee, IL (US)

(73) Assignee: USF Consumer & Commercial WaterGroup, Inc., Northbrook, IL (US)

( * ) Notice: Subject to any disclaimer, the term of this patent is extended or adjusted under 35 U.S.C. 154(b) by 0 days.

(21) Appl. No.: 09/945,066

(22) Filed: Aug. 31, 2001

(65) Prior Publication Data

US 2003/0041908 A1 Mar. 6, 2003

(51) Int. Cl.[7] ............................. F16K 11/07; B01D 24/46
(52) U.S. Cl. .................. 137/625.48; 210/191; 210/278; 210/426
(58) Field of Search ..................... 137/625.48; 210/190, 210/191, 275, 278, 426

(56) References Cited

U.S. PATENT DOCUMENTS

| 2,800,229 | A | * | 7/1957 | Spaulding, Jr. .............. 210/142 |
| 3,380,590 | A | * | 4/1968 | Grayson ....................... 210/134 |
| 3,872,004 | A | * | 3/1975 | Grout et al. ................... 210/127 |
| 4,290,451 | A | * | 9/1981 | Fleckenstein et al. .. 137/624.15 |
| 4,869,817 | A | * | 9/1989 | Mendoza et al. ............ 210/169 |

FOREIGN PATENT DOCUMENTS

| EP | 0 937 941 A1 | 8/1999 |
| FR | 2 250 938 | 6/1975 |
| GB | 1 277 617 A | 6/1972 |

* cited by examiner

Primary Examiner—John Fox
(74) Attorney, Agent, or Firm—Greer, Burns & Crain, Ltd.

(57) ABSTRACT

A water conditioner valve configured for use with a tank in a water conditioning system, including a main housing a working portion disposed within the main housing and further including at least one valve chamber, and at least a portion of the working portion is mounted within the tank.

16 Claims, 10 Drawing Sheets

IN-TANK WATER CONDITIONER VALVE

BACKGROUND OF THE INVENTION

The present invention relates to a device for the conditioning of a liquid in a liquid treatment system, in particular a device for conditioning of liquid in a liquid treatment system where the device fits at least partially within a treatment tank.

Conventional liquid treatment devices, such as water softeners, are typically used in conjunction with a liquid reservoir, such as a water treatment tank. A resin bed is used to treat the incoming raw water to obtain soft water. This resin bed requires periodic flushing and regeneration to remove sediment and chemically recharge the bed. Typically, in a process known as eduction, a brine solution is passed over the resin bed to chemically recharge the resin. Often, eduction is preceded by a backwash step, in which the flow of incoming water is reversed to remove sediment which has been separated from the water during the conditioning operation and which may interfere with the softening operation. In these instances, the systems are known as "five cycle" systems, wherein regeneration involves a backwash step, a brine rinse, a slow rinse, a fast rinse, and a refilling of the brine tank. A typical softening system is disclosed in U.S. Pat. No. 5,174,466, which is incorporated by reference.

As is well known in the art, water conditioners, such as water softeners, are provided with various mechanisms for initiating regeneration. Some of such mechanisms are clock-operated, and are triggered to begin at a time of day, while others are triggered by a threshold volume of treated water. Still other mechanisms trigger regeneration by monitoring the condition of the resin in the resin bed.

Conventional water conditioners are also typically provided with valves for controlling the flow of water from a brine reservoir to the incoming raw water, from the raw water inlet to the raw water outlet, from the tank to a manifold, from the manifold to the tank, and from the manifold to the soft water outlet.

A main drawback of conventional water conditioner control valves, however, is that they are affixed to an external part of the liquid treatment tank. Because the valve is affixed externally to the tank, the combined size of the valve and tank becomes a necessary consideration when calculating the space required to house the liquid treatment system. The size of the apparatus becomes an impediment because the storage space reserved for a liquid treatment system is typically fixed, and is typically optimized to consume the least possible space. On the other hand, the size of the tank is optimized to be as large as the space will permit, allowing larger volumes of liquid to be conditioned. Because the size of the apparatus must be accounted for when determining the size of this space, it ultimately restricts the size of the tank.

Another drawback of conventional water conditioners is that the conventional configuration is susceptible to leaking. An externally affixed water conditioner valve is surrounded by ambient air pressure, whereas the liquid coursing within the valve exerts a liquid pressure. If this pressure differential is not constantly balanced, the valve can rupture and leak into the surrounding environment, such as a floor in a home, office, or other building. Also, to combat this pressure differential, thicker, sturdier, and more rigid constituent valve material is required. In addition to increasing expense, the need to utilize such materials restricts the configuration of the valve and the manner in which it is connected to the tank.

Accordingly, a first object of the present invention is to provide an improved liquid treatment system having a liquid conditioner control valve which fits at least partially within a treatment tank.

Another object of the present invention is to provide an improved liquid treatment system having a liquid conditioner control valve which optimizes use of limited space.

Yet another object of the present invention is to provide an improved liquid treatment system having a liquid conditioner control valve where the external portions of liquid conditioner control valve chambers are at least partially subject to the same liquid pressure as internal portions of liquid conditioner control valve chambers.

Still another object of the present invention is to provide an improved liquid treatment system having a liquid conditioner control valve constructed from a wide variety of materials.

Yet another object of the present invention is to provide an improved liquid treatment system having a liquid conditioner control valve wherein leaks caused by ruptured valve chambers are reduced or eliminated.

Still a further object of the present invention is to prove an improved liquid treatment system having a liquid conditioner control valve wherein leaks are localized and contained within an associated tank.

BRIEF SUMMARY OF THE INVENTION

The above-listed objects are met or exceeded by the present in-tank water conditioner valve, which features a water conditioner valve having a working portion disposed at least partially within a tank in a liquid conditioning system. Thus, the vertical overhead space required for the system is reduced, allowing for the use of taller and larger tanks, which both permits optimization of limited space and maximization the volume of liquid conditioned. In addition, the working portion includes first and second valve chambers having respective main and supplemental pistons. Since the first and second valve chambers of the working portion are at least partially disposed within the tank of the liquid conditioning system, there is an inherent balance in the internal pressure exerted on these chambers by the liquid coursing within them and the external pressure exerted on these chambers by the surrounding liquid. Therefore, component parts require less durability than ordinarily required to withstand pressure differentials. Another feature of the invention is that because the working portion is located at least partially within the tank, the leaks that do occur will drain into the tank rather than into the external environment.

More specifically, the present invention provides a water conditioner valve configured for use with a tank in a water conditioning system, including a main housing and a working portion disposed within the main housing. At least a portion of the working portion is mounted within the tank.

DETAILED DESCRIPTION OF THE INVENTION

Figure 1A:
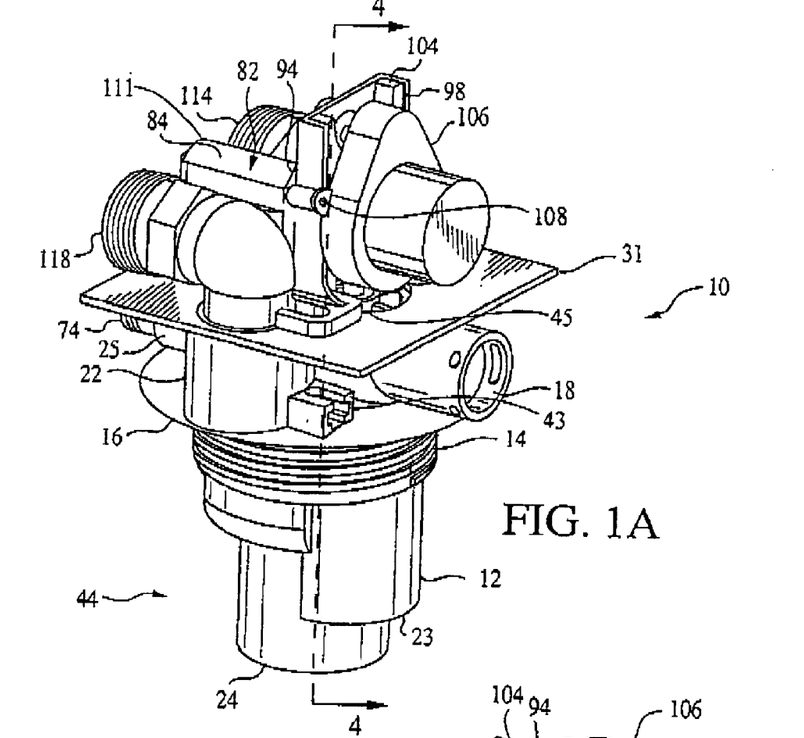
FIG. 1A is a left side perspective view of the present liquid conditioner valve.
Figure 1B:
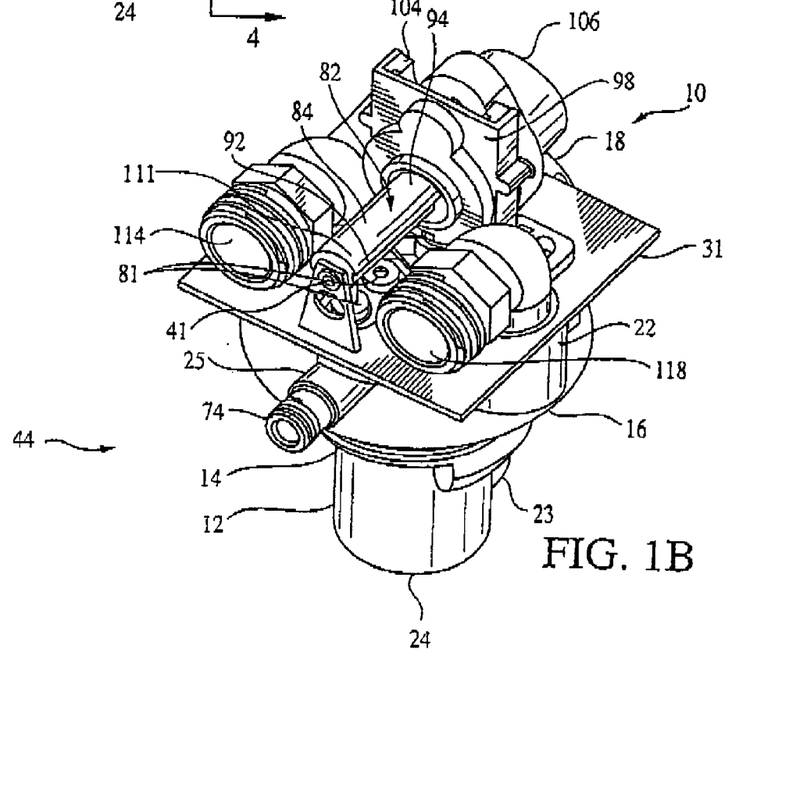
FIG. 1B is a front perspective view of the present liquid conditioner valve.
Figure 8:
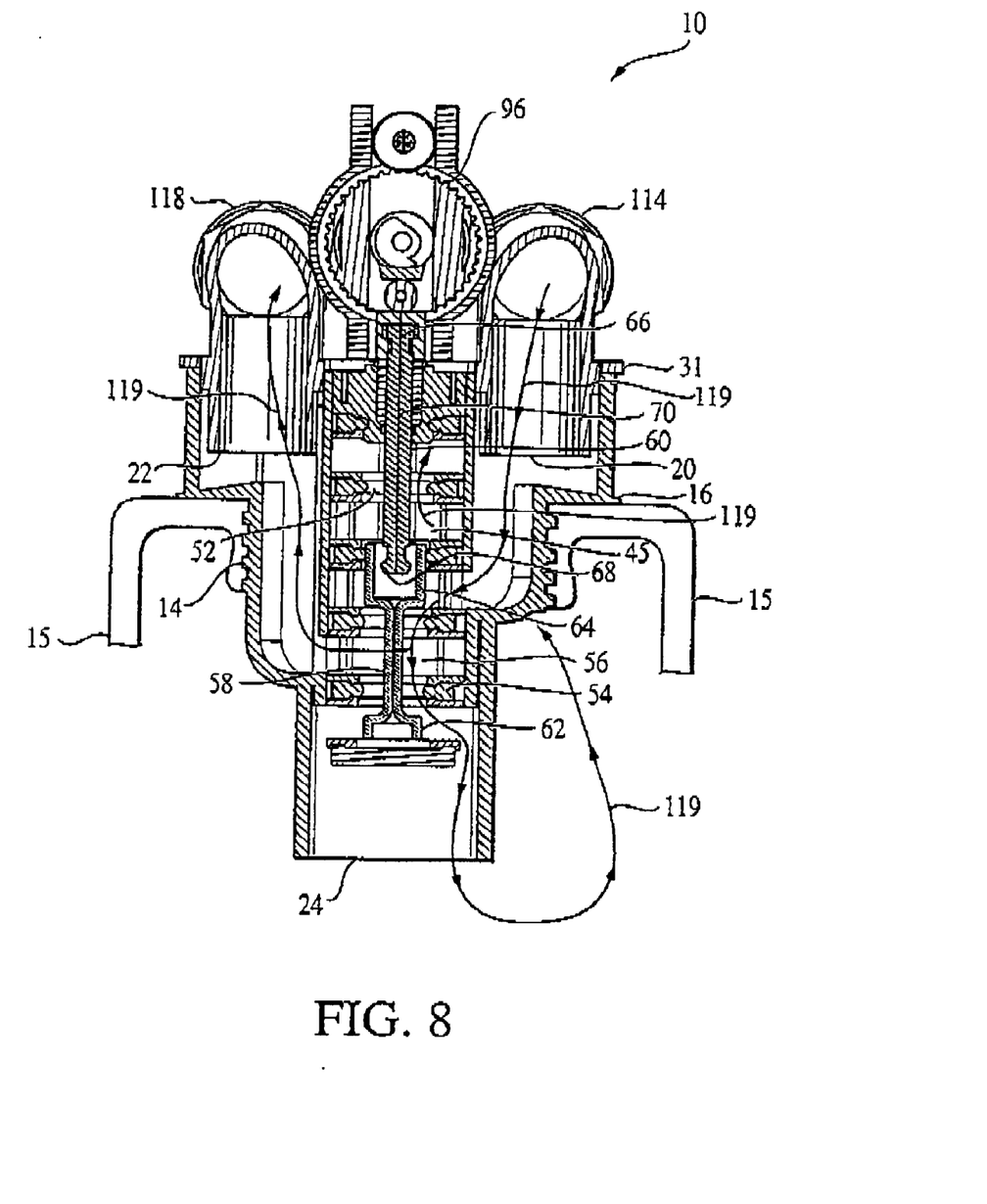
FIG. 8 is a sectional view of the present liquid conditioner control valve in the backwash position, taken along the line 3—3 of FIG. 2.

Referring now to FIGS. 1A and 1B, the present water conditioner valve is generally indicated at 10, and includes a housing 12 with an at least partially threaded circumference 14 configured for attachment to liquid conditioner resin or treatment tank 15 (FIG. 8). A suitable resin tank is described in commonly-assigned U.S. Pat. No. 5,174,466, which is incorporated by reference. The housing 12 also includes a generally circular, radially extending flange 16 configured atop the partially threaded circumference 14, which matingly engages a generally circular opening in the resin tank 15 (FIG. 8).

Figure 2:
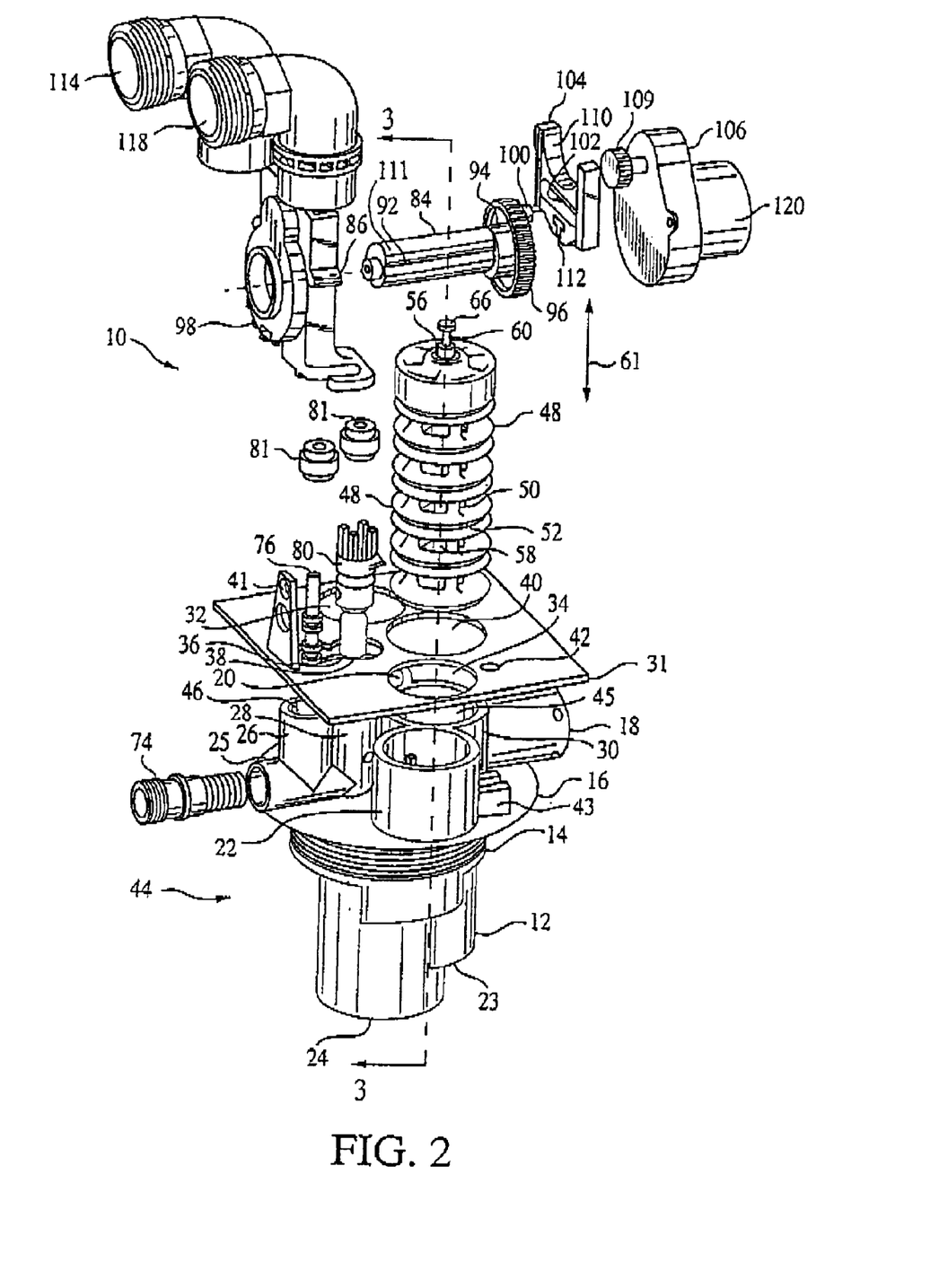
FIG. 2 is an exploded perspective view of the present liquid conditioner valve.

The housing 12 is preferably made of a rigid, durable environmentally resistant injected molded plastic, and as such is made of several pieces joined together by vibration or hot plate welding, or chemical adhesive to create a series of water communication galleries between a water source, a brine tank (not shown), a DRAIN port 18 and the resin tank 15 (FIG. 8), as is well known in the art. Thus, as illustrated in FIG. 2, the housing 12 includes a RAW IN port 20, a SOFTENED OUT port 22, a TANK IN port 23 as well as a TANK OUT port 24, a BRINE port 25, and the DRAIN port 18. Also included in the housing 12 are a brine valve portal 26, a brine eductor portal 28 and a main valve chamber portal 30.

A mounting plate 31 is fastened to the top of the housing 12. The mounting plate 31 includes a plurality of apertures 32, 34, 36, 38, 40, the circumferences of which are vertically aligned with the RAW IN port 20, the SOFTENED OUT port 22, the brine valve portal 26, the brine eductor portal 28 and the first valve chamber portal 28, respectively. When assembled, each respective aperture receives its corresponding portal, and maintains engagement between the portals and the mounting plate 31. A mounting eyelet 41 is integrally formed with the mounting plate 31. The mounting plate 31 is secured to the housing 12 by inserting a threaded fastener (not shown) through a hole 42 in the mounting plate. The threaded fastener then mates with a nut (not shown) held in a nut holder 43 that is affixed on the flange 16.

Water treatment in the instant water conditioner valve 10 is carried out by a working portion of the water conditioner valve, designated generally at 44 in FIGS. 1A, 1B and 2, wherein the working portion is housed within the housing 12. An important feature of the present invention is that the components of the working portion 44 that are below the flange 16 are disposed within the tank 15. This confers a number of advantages to the present water conditioner valve 10, most significantly reducing the overhead space consumed by the valve/tank assembly, which ultimately minimizes the overall space required to house the valve/tank assembly. This configuration is further advantageous because leaks within the valve 10 will be contained within the tank 15, within which components of the working portion 44 that are below the flange 16 are housed. Such a feature is advantageous because leaks which would otherwise damage the floor around the tank 15 are entirely avoided. Furthermore, the liquid coursing throughout the water conditioner valve 10 exerts a pressure on the inside of the valve whereas the ambient air pressure surrounding the valve is significantly less. This mandates that the material of which the valve 10 is constructed be relatively thick and rigid, and able to withstand the internal pressure applied by the liquid within the valve. However, by housing the portion of the working portion 44 within the tank, the ambient air pressure is replaced by ambient liquid pressure, which is more or less equal to the pressure exerted by the liquid within the valve 10. Thus, the material comprising the valve 10 need not withstand differential internal and external pressures. Therefore, the configuration of the instant invention further provides a greater measure of flexibility in selection when choosing the constituent material for the valve 10.

The working portion 44 includes a main valve chamber 45 and a second valve chamber 46, both of which are vertically oriented within the working portion 44. The main valve chamber, designated generally at 45 in FIG. 2, is a seal pack of unitary construction, and is formed of a plurality of vertically stacked, axially spaced annular members 48 with vertically oriented columns 50 separating each annular member. Each annular member 48 contains a groove 52 around its outer circumference, and each groove is configured to accommodate a sealing member 54, for example an O-ring or other known equivalent sealing ring. One of the advantages of the present valve 10 is that the internal components, including the main valve chamber 45, can be manufactured to use less material and to be overall lower in cost, since they are not subject to the relatively large pressure differentials encountered by conventional valves located fully outside of the tank 15.

Figure 3:
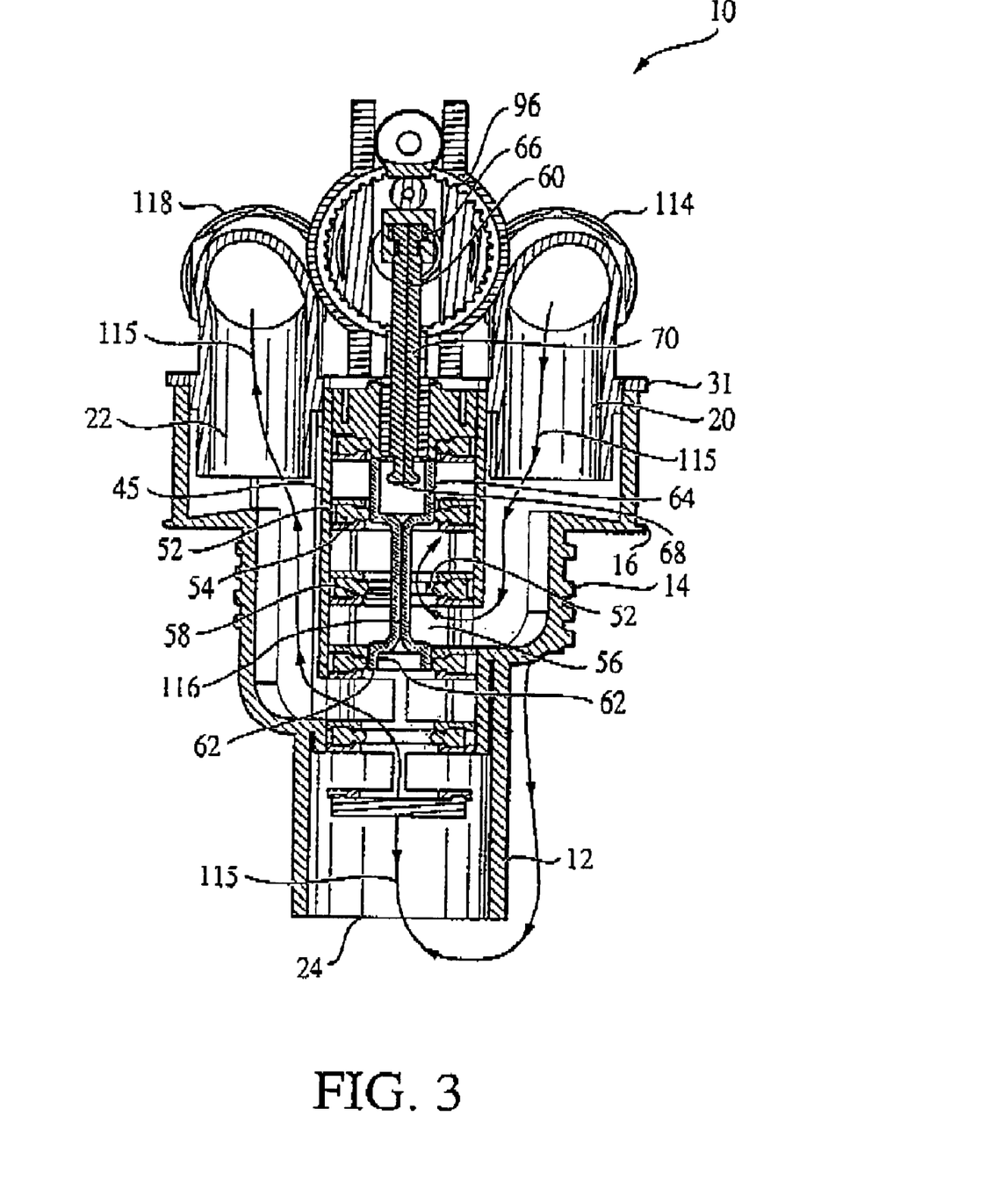
FIG. 3 is a sectional view, taken along the line 3—3 of FIG. 2, of the present liquid conditioner control valve in the service position.

Referring now to FIG. 3, at the center of the main valve chamber 45 and reciprocally passing vertically through the centers of each annular member 48 is a cylinder 56 configured to house a main piston 58 and a lead pin 60. The main piston 58 in the preferred embodiment is barbell-shaped and is vertically mounted in the direction designated generally at 61 in FIG. 2, for reciprocal linear movement in the cylinder 56 of the main valve chamber 45, and has a first or lower end 62 and a rod end 64. Both the lower end 62 and the rod end 64 are dimensioned to sealingly and slidably engage the sealing members 54. More specifically, the lower end 62 in the preferred embodiment is configured to be "T"-shaped when viewed in section, with a larger diameter portion dimensioned to sealingly engage any one of a plurality of the sealing members 54. Similarly, the rod end 64 flares into a larger diameter shaped portion, and is configured on its upper extremity to securely engage a radially expanded second end 68 of the lead pin 60. The lead pin 60 is generally vertically oriented, having narrow-necked or inverted "T"-shaped first and second ends 66, 68 separated from each other by a pin shaft 70.

Figure 4:
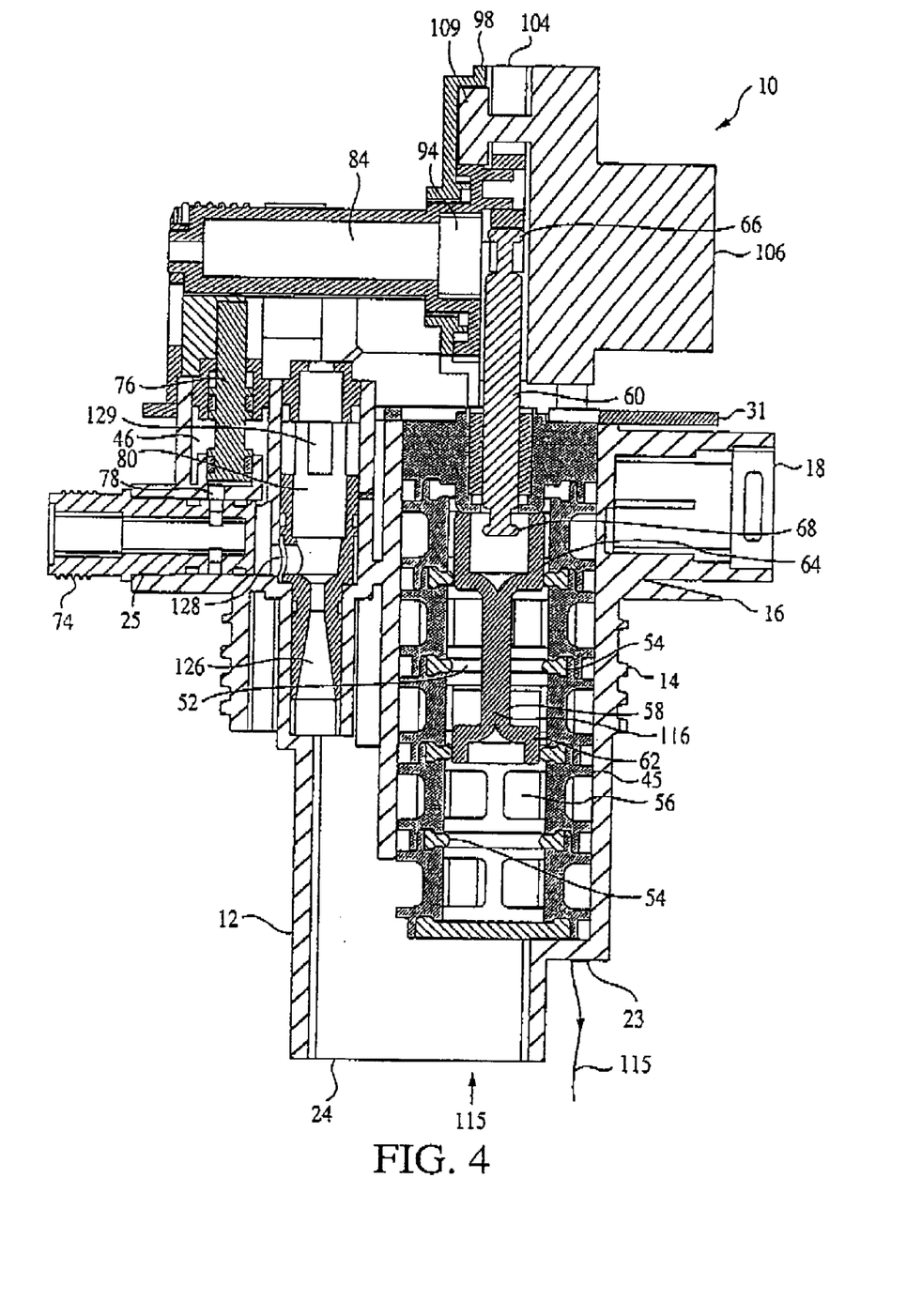
FIG. 4 is a sectional view, taken along the line 4—4 of FIG. 1A and in the direction indicated generally, of the present liquid conditioner control valve in the service position.

Referring now to FIGS. 2 and 4, also included in the working portion 44 is the second valve chamber 46. In the preferred embodiment, this second valve chamber 46 is a brine valve chamber. The second valve chamber 46 is in selective fluid communication with a remote brine tank (not shown) via the BRINE port 25 to which is threaded a hollow brine fitting 74. A brine piston 76, which is vertically mounted for reciprocal movement in the second valve chamber 46, is configured and arranged to sealingly engage an eductor slot 78 (see FIGS. 4, 5, 6 and 7) situated at the interface of the BRINE port 25 and the second valve chamber 46. An eductor body 80, which acts as a siphon during operation of the water conditioner valve during the eduction/slow rinse and brine refill cycles, is in selective fluid communication with the BRINE port 25. The interface between the mounting plate 31 and the brine piston 76 and eductor body 80 is secured by end caps 81 fastened to each of the brine piston and eductor body.

In operation, each piston 58, 76 is selectively driven by a valve control system, generally designated at 82 in FIGS. 1A and 1B. Referring to FIG. 2, the preferred embodiment includes a cam member 84 as the main component of the valve control system. The cam member 84 is eccentrically lobed, having a longitudinal axis of rotation 86 that is generally perpendicular to the orientation of the main valve chamber 45. The cam member 84 has a generally circular circumference, with the longitudinal axis of rotation 86 being eccentric with respect to the center point of the circumference. Thus, in operation, the cam member 84 rotates along its longitudinal axis 86 at gradually varying heights with respect to the mounting plate 31, depending on the period of rotation of the cam member 84.

Referring to FIG. 2, a base portion 94 of the cam member 84 has a ring of gear teeth 96 which are configured to nest within a mounting bracket 98 that is configured to receive the ring of gear teeth 96. A cam follower 100 extends transversely from the ring of gear teeth 96 at the base portion 94 of the cam member 84. In operation of the preferred embodiment, the cam follower 100 engages a guide slot 102 of a sliding yoke 104 that is configured to nestle between a motor 106 and the ring of gear teeth 96. The motor 106 is mounted to the mounting bracket 98 with threaded fasteners 108 or other conventional technology.

The mounting bracket 98 also includes an accommodation space (not shown) that is configured to receive a pinion 109 that extends transversely from an upper end of the motor 106. The sliding yoke 104 that receives the cam follower 100 also includes a generally concave, hemispherical arc 110 so that the sliding yoke does not interfere with engagement of the pinion 109 and the ring of gear teeth 96, and does not prevent vertical reciprocation of the sliding yoke.

Thus, when driven by the motor 106, the pinion 109 drives the corresponding ring of gear teeth 96 within the mounting bracket 98, and the row of gear teeth is consequently rotated. This rotational motion translates into horizontal reciprocation of the cam follower 100 within the guide slot 102. However, because the cam member 84 is affixed to the mounting eyelet 41 at an end 111 opposite the row of gear teeth 96 (see FIGS. 1A and 1B), the horizontal reciprocation of the cam follower 100 within the guide slot 102 translates into vertical reciprocation of the sliding yoke 104, which is only limited in its vertical movement by the depth of the hemispherical arc 110. Thus, when driven by the motor 106, the sliding yoke 104 reciprocates vertically with respect to the mounting plate 31.

The first end 66 of the lead pin 60 is matingly engaged with the sliding yoke 104 at a slot 112 that is configured to receive and securely hold the lead pin on a surface opposite the guide groove 102. This in turn facilitates the vertical reciprocation of the lead pin 60 within the main valve chamber 45.

Thus, in operation of the preferred embodiment, the motor 106 causes the rotation of the pinion 109 that is engaged with the ring of gear teeth 96 within the mounting bracket 98. The ring of gear teeth are then rotated, which drives rotation of the cam member 84. This rotational motion translates into horizontal reciprocation of the cam follower 100, so that as it reciprocates horizontally within the guide slot 102, it causes the sliding yoke 104 to reciprocate vertically. The lead pin 60, being attached to the sliding yoke 104 at its first end 66, is similarly vertically reciprocated.

The cam member 84 is also positioned to be in frictional engagement with the brine piston 76, which is spring loaded and biased to be in an open position. Thus, as seen in FIG. 4 for example, a spring 113 (best seen in FIG. 6) is disposed between the the eductor slot and the brine piston 76 and is biased in a direction away from the eductor slot 78. In this open position, the spring 113 biases the brine piston upward, leaving the eductor slot 78 in its open position. Therefore, as the cam member 84 rotates and reduces the displacement between the cam member 84 and the mounting plate 31, the spring 113 is depressed, which in turn depresses the brine piston 76 to its closed position within the second valve chamber 46. Correspondingly, because the spring 113 is biased in a direction away from the eductor slot 78, the brine piston 76 reciprocates upward within the second valve chamber 46 when the displacement between the cam member 84 and the mounting plate 31 increases.

As seen in FIG. 2, the motor is controlled by an electronic control system 120 of the type that is known in the prior art. For example, U.S. Pat. No. 6,176,258, incorporated by reference, discloses a suitable electronic control system.

The present water conditioner valve 10 is preferably configured to perform at least four separate cycles, depending on the relative positions of the pistons 58, 76, which facilitate selective fluid communication within the water conditioner valve. For example, the water conditioner valve 10 preferably performs a service cycle, wherein water or other fluid is deionized and otherwise purified. During a backwash cycle, water flows in a reverse direction to flush sediment and other debris from the valve 10 and the tank (not shown). A brine/slow-rinse cycle facilitates regeneration of the resin bed within the tank (not shown), and a refill cycle allows the valve 10 and tank to return to a service cycle.

Referring now to FIGS. 3 and 4, the water conditioner valve 10 is illustrated in the service position. In this position, the treated water from the treatment tank is dispensed through the valve 10 to plumbing fixtures of the residence or building for use. The brine piston 76 is located at a first position in the second valve chamber 46, and the main piston 58 is also located at a first position in the main valve chamber 45.

Raw water passes through an inlet pipe 114 that is matingly engaged with the RAW IN port 20, and into the main valve chamber 45. Lining the chamber 45 are the axially spaced annular members 48 which form seal ring grooves 52. The seal ring grooves 52 are dimensioned so that when equipped with seal rings 54, the main piston 58 will be slidingly, yet sealing engaged therein.

In the absence of the main piston 58, there is free communication of water within the main valve chamber 45 into the various ports which open into the main valve chamber. In the main valve chamber 45, these ports include the RAW IN port 20 (FIG. 2), the TANK IN port 23 (FIG. 1A), the DRAIN port 18 (FIG. 2), the TANK OUT port 24 (FIG. 2) and the SOFTENED OUT port 22 (FIG. 2). Thus, in the service position, the flow of water, represented by the arrows 115 in FIGS. 3 and 4, passes from the RAW IN port 20 (not shown in FIG. 4) to the TANK IN port 23, from where it is passed in to the treatment tank (not shown). The rod end 64 of the main piston 58 blocks off the DRAIN port 18, and a narrowed central portion 116 permits fluid communication between the TANK OUT port 24 to the SOFTENED OUT port 22, where it passes to a treated water outlet 118. At the lower end 62 of the main piston 58, engagement with the respective annular member 48 and the corresponding 0-ring 54 prevent water from leaking into the TANK OUT port 24.

While the valve 10 is in the service position, with the main piston 58 disposed as described above, the brine piston 76 is in the first position, referred to as a park position. In the park position, ports in the eductor body 80 are closed by the seal rings 54 located in a plurality of seal ring grooves 52 to prevent any fluid communication between the brine tank and the treatment tank.

As the motor 106 rotates the cam member 84, the main piston 58 can be reciprocated upward with respect to the mounting plate 31, which results in a shift to the backwash cycle. As seen in FIG. 8, water in the backwash cycle flows in the direction indicated by the arrows at 119. A number of conventional methods known in the art can determine the timing of this movement by the main piston 58. The backwash cycle begins the regeneration cycle, and is triggered by the number of gallons dispensed, the time of day, or the ionic condition of the resin media in the treatment tank or the like, as desired in any particular application. The cam member 84 is rotated until the main piston 58 is in a second position in FIG. 5, and the brine piston 76 is still in the park position.

Figure 5:
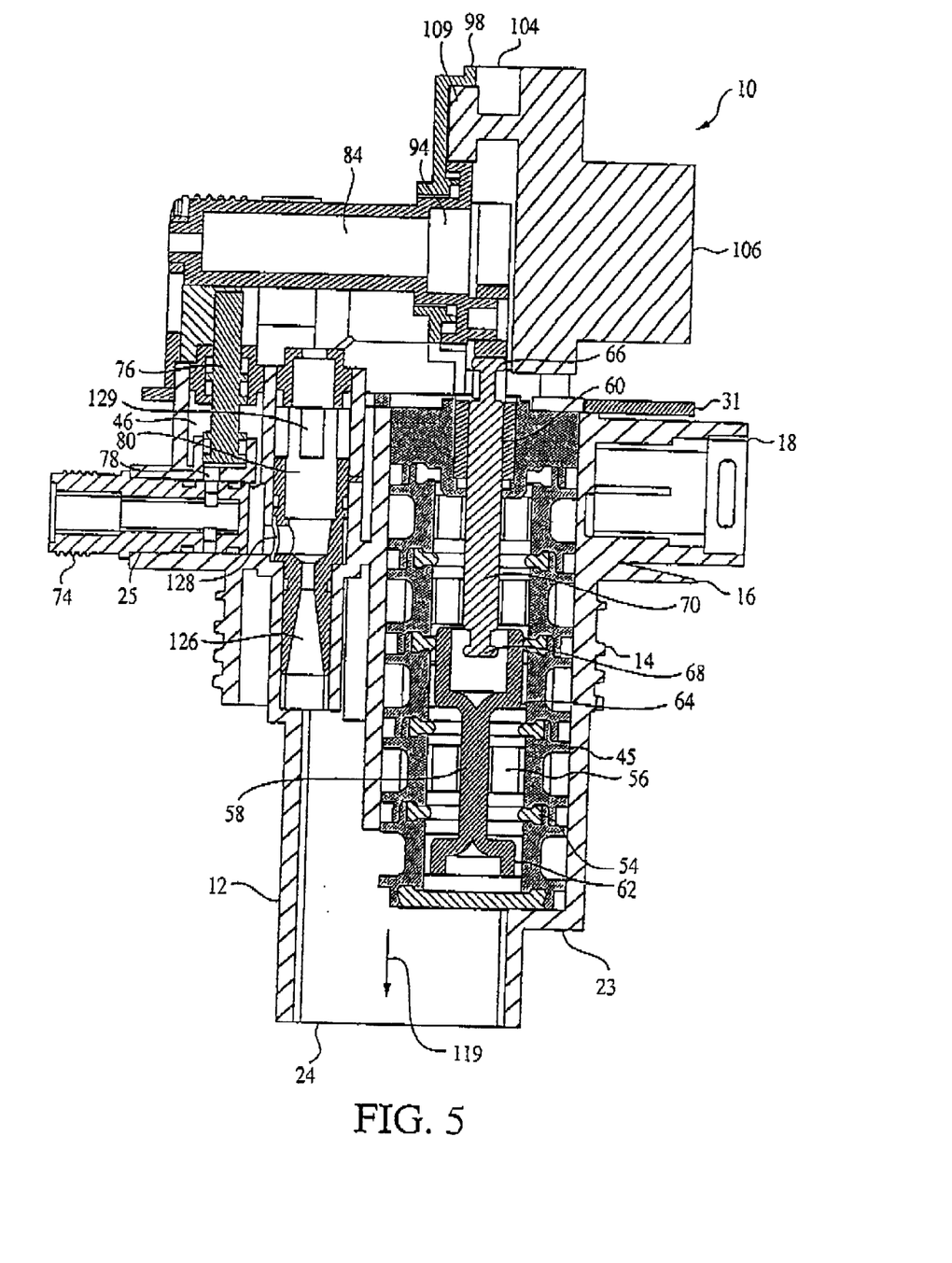
FIG. 5 is a is a sectional view of the control valve of FIG. 4 shown in the backwash position.

Referring now to FIGS. 5 and 8, in the backwash position, the brine piston 76 is still in the park position, with all ports blocked. The main piston 58 has been moved to a second position such that the raw water entering the valve 10 is diverted through the bottom of the valve and into the tank 15 via the TANK OUT port 24. The water flows in a reverse direction, depicted by the arrows 119, through the treatment tank 15 to flush sediment collected during the service position and to loosen up the resin bed for better brine contact. The flow of water then reenters the main valve chamber 45 from the TANK IN port 23 and into the DRAIN port 18, which passage is made possible by the narrowed central portion 116 of the main piston 58. The backwash process continues for about 5 to 10 minutes, which time is counted by the electronic control system 120. In the event that the residence needs water during backwashing, raw, untreated water may also flow out the SOFTENED OUT port 22.

Figure 6:
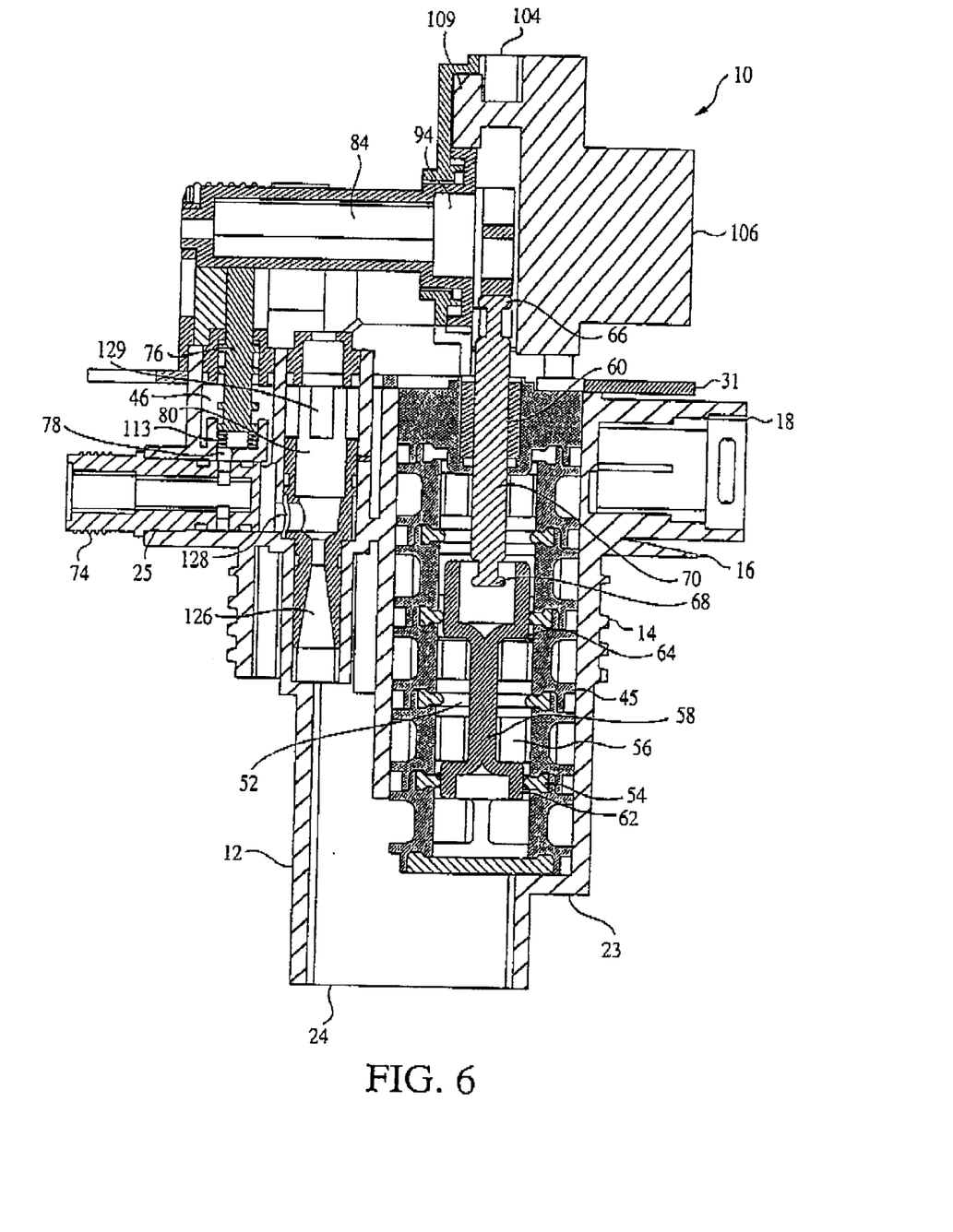
FIG. 6 is a sectional view of the valve of FIG. 4 shown in the brine/eduction position.
Figure 9:
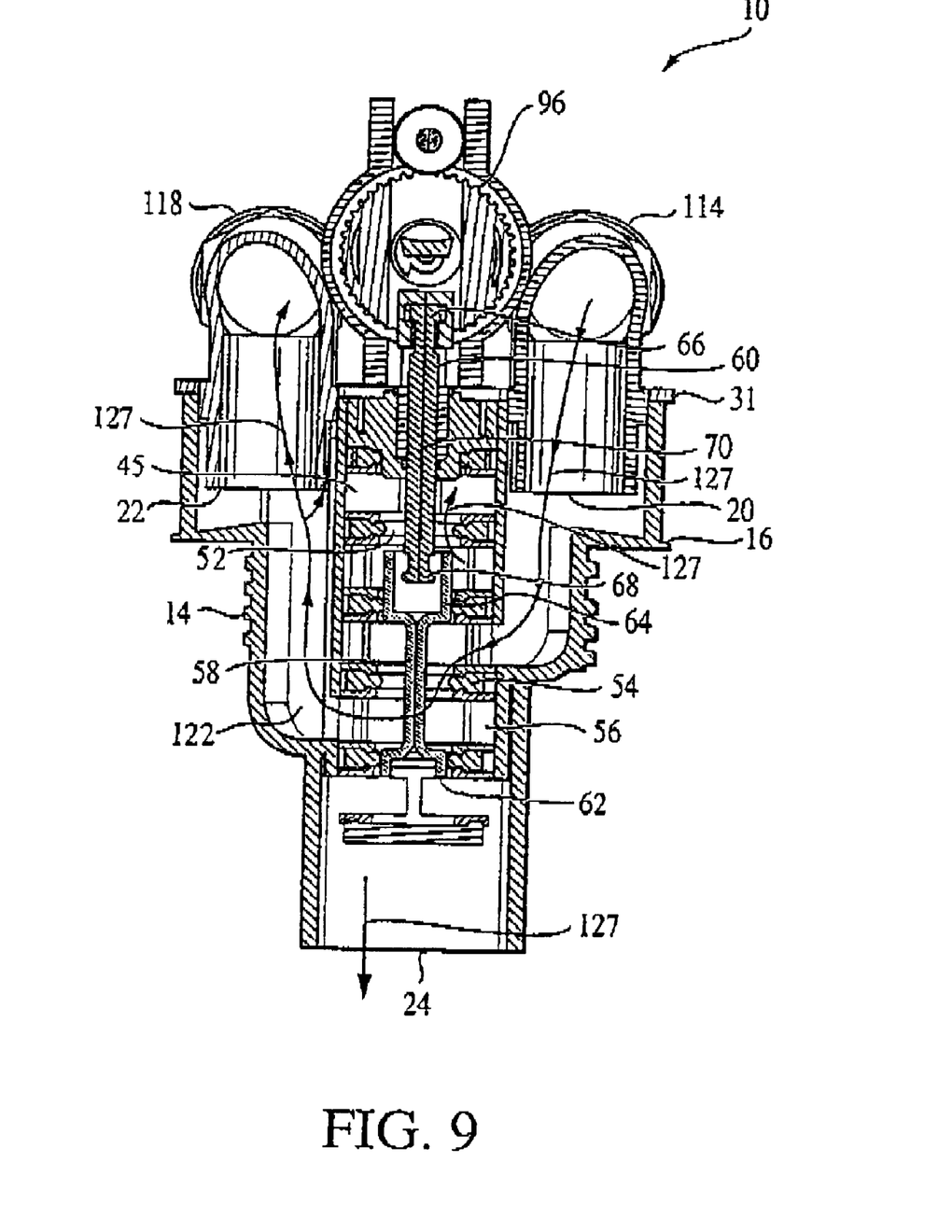
FIG. 9 is a sectional view of the present liquid conditioner control valve in the brine/slow-rinse position, taken along the line 3—3 of FIG. 2.

Referring now to FIGS. 6 and 9, once the electronic control system 120 determines that the backwash time has expired, it signals the motor 106 to turn the cam member 84 to the eduction/slow rinse position, in which brine from the brine tank is drawn into the treatment tank. Thus, in this position, both pistons 58 and 76 will be moved. The main piston 58 is moved to the third position and the brine piston 76 is moved to a second position, which is the open position. Water and brine flow in the direction indicated by the arrows 127 in FIG. 9.

As illustrated in FIG. 6, in the eduction/slow rinse position, the main piston 58 is positioned so that raw water entering the RAW IN port 20 enters a bypass channel 122, from where it can flow out the SOFTENED OUT port 22 for use by the residence, even though it is untreated. Also, the central portion 116 of the main piston 58 is positioned so that water can also flow from the TANK OUT port 24 to the DRAIN port 18. Another portion of the main flow in the bypass channel 122 travels to an EDUCTION port 124, where it passes into the eductor body 80 through an eductor body passage 129.

At the eductor body 80, an eductor nozzle 126 (best seen in FIG. 6) acts as a siphon, using the main flow of raw water to draw, using suction, brine from the brine tank into the eductor body. In this manner, raw water and brine are mixed as they pass into the treatment tank 15.

More specifically, the brine is drawn in through the brine port 25, through the eductor slot 78 into the second valve chamber 46 and out through an eductor outlet 128. The eductor outlet 128 is in fluid communication with the TANK IN port 23. Mixing occurs in the eductor nozzle 126 when water enters the eductor body through the eductor body passage and commingles with the brine. In the main valve chamber 45, the mixture of brine and raw water enters the TANK IN port 23, and then regenerates the resin media before it passes through the TANK OUT port 24 and eventually to the DRAIN port 18.

Once the brine tank is emptied, the pistons 58, 76 maintain their positions. In this manner, raw water then flows through the same passages and ports to perform a slow rinse step. This begins to purge the brine from the treatment tank. Due to this dual function, this position is the longest in the regeneration cycle, lasting approximately 60 to 70 minutes.

Figure 7:
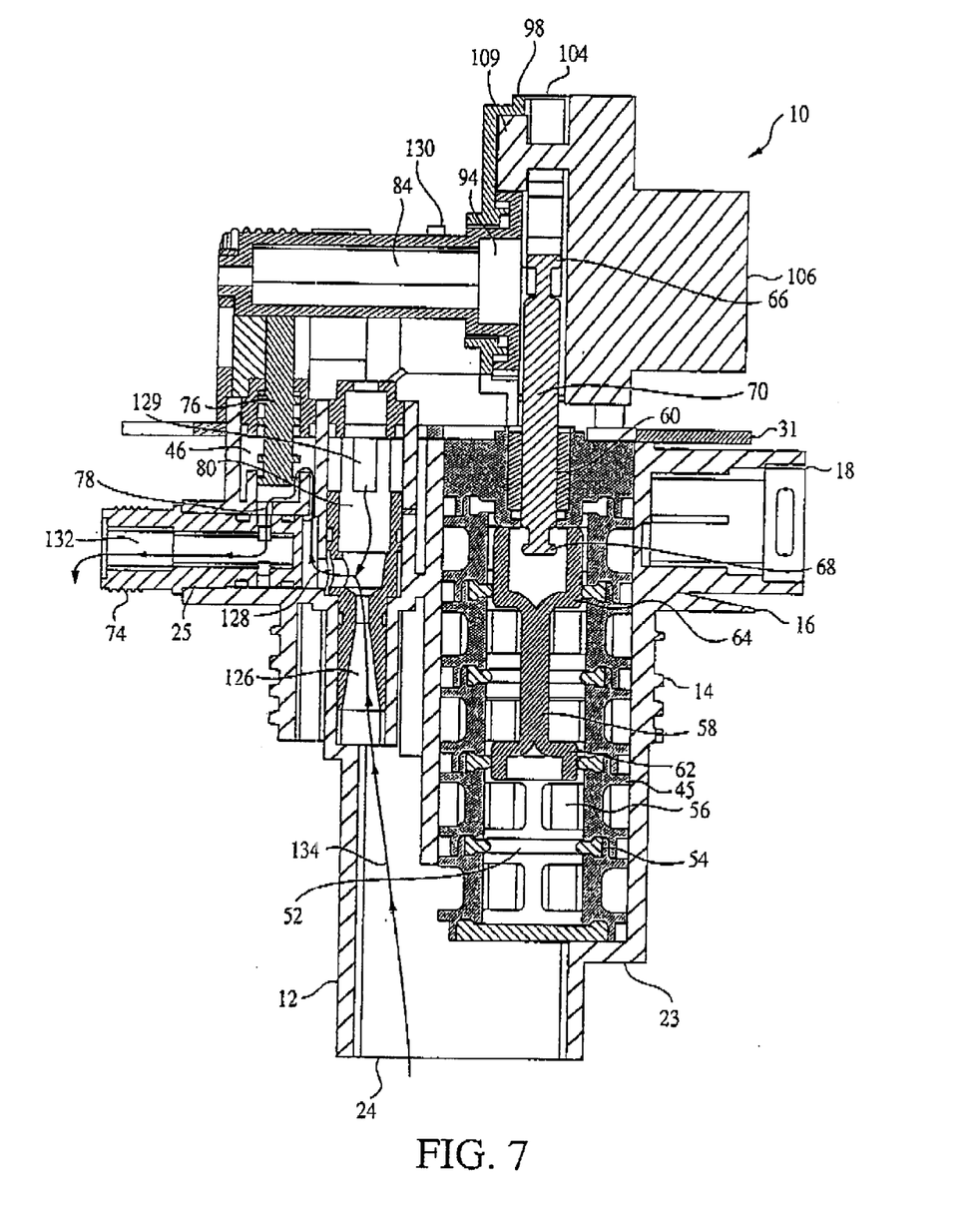
FIG. 7 is a sectional view of the valve of FIG. 4 shown in the refill position.
Figure 10:
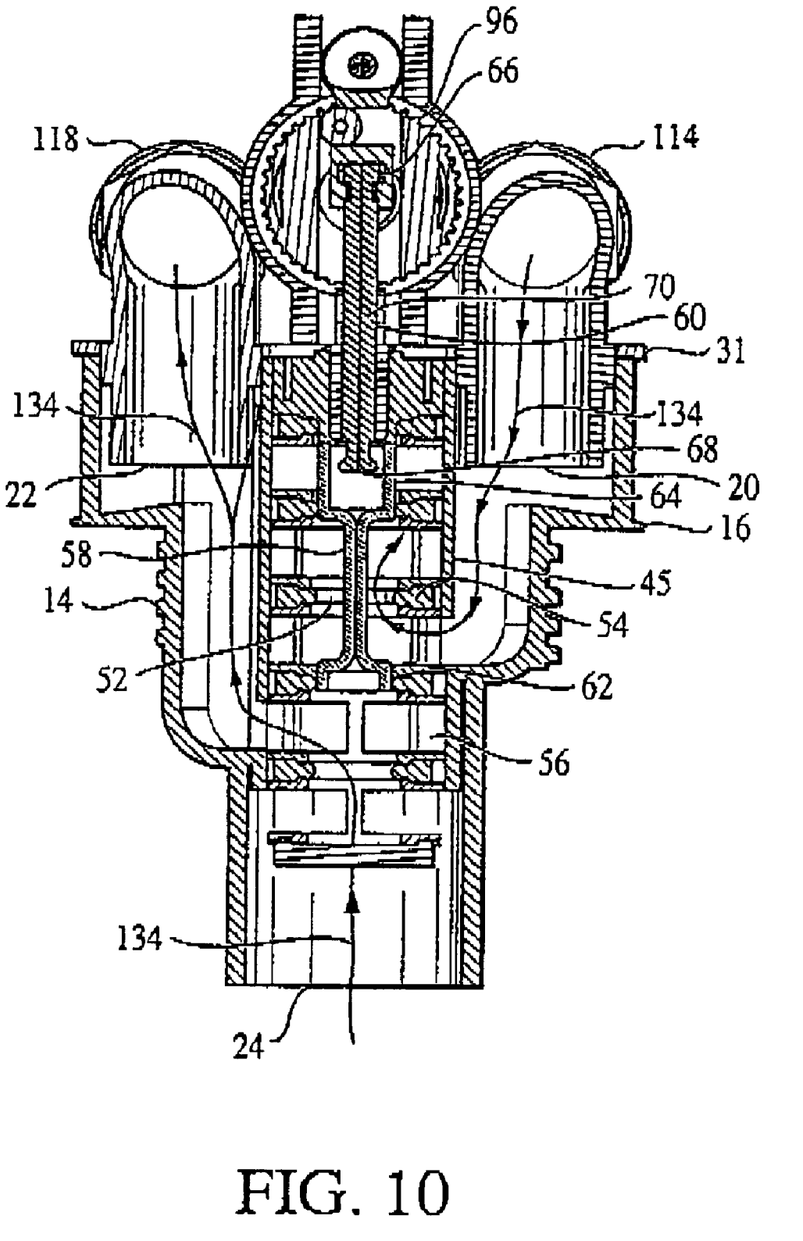
FIG. 10 is a sectional view of the present liquid conditioner control valve in the refill position, taken along the line 3—3 of FIG. 2.

Referring now to FIGS. 7 and 10, the next step is called brine refill, in which water is reintroduced into the brine tank to mix with the salt therein and provide a new supply of brine for the next regeneration. The electronic control system 120 signals the motor 106 to move until the main piston 58 is again in the first position, and the brine piston 76 remains in the open position. The motor 106 will turn the cam member 84 until signaled by a program switch (designated schematically at 130 in FIG. 7) engaging the cam, indicating that the pistons are in their designated positions As illustrated in FIG. 7, the main piston 58 has been moved back into the first position so that its blind end 62 once again sealingly engages the seal groove 52 and respective seal ring 54 that prevent water from leaking into the bypass channel 122. The DRAIN port 18 is similarly blocked. Raw water entering the main valve chamber 45 from the RAW IN port 20 passes directly into the TANK IN port 23. Treated or softened water is emitted from the TANK OUT port 24 and ultimately through the SOFTENED OUT port 22. A portion of the SOFTENED OUT water is diverted into a brine refill chamber 132, which is in fluid communication with the eductor body passage 129 in the eductor body 80. Water flow is indicated by the arrows 134 and flows in a generally inverted "U"-shaped pattern into the eductor body passage 129 and ultimately into the brine tank. The duration of this last cycle is controlled by the electronic control system 120. The electronic control system 120 then signals the motor 106 to move the cam member 84 back to the service position. In this manner, the regeneration cycle is completed.

Thus, in the present water conditioner valve 10, at least a portion of the working portion fits at least partially within the treatment tank 15, reducing the vertical overhead space consumed by the water conditioner valve. Also, because it is at least partially housed within the tank, leaks occurring within the valve are contained by the tank, and do not leak onto the floors of the residence or building. Further, components of the valve 10 may be less expensively produced due to lower structural demands. Also, a cam member 84 is provided for controlling both the main piston 58 and the brine piston 76 in a single unit, which reduces components, increases efficiency and provides positive control of the pistons in both operational directions.

While a particular embodiment of the in-tank water conditioner valve invention has been shown and described, it will be appreciated by those skilled in the art that changes and modifications may be made thereto without departing from the invention in its broader aspects and as set forth in the following claims.

What is claimed is:

1. A water conditioner valve configured for use with a tank in a water conditioning system, the tank having an opening for receiving the valve, said valve comprising:
   a main housing having a formation configured for abutting an opening in the tank, a substantial portion of said main housing being disposed below said formation and inside the tank;
   said main housing having a plurality of ports disposed below said formation and inside the tank;
   a working portion disposed within said main housing and including a main valve chamber configured for providing selective fluid communication between said plurality of ports inside the tank; and
   wherein a major portion of said main valve chamber is mounted below said formation and inside the tank.

2. The water conditioner valve as recited in claim 1, wherein at least a portion of a circumference of said housing is threaded for coupling to the tank.

3. The water conditioner valve as recited in claim 1, wherein said main valve chamber has a longitudinal axis, and said longitudinal axes of said at least one valve chamber are vertically oriented.

4. The water conditioner valve as recited in claim 1, wherein said main valve chamber includes a plurality of seals for selective fluid communication between said plurality of ports.

5. The water conditioner valve as recited in claim 1, wherein said main valve chamber is of unitary construction.

6. The water conditioner valve as recited in claim 1, further including a second valve chamber that is an eductor chamber.

7. A water conditioner valve as recited in claim 1, wherein said main valve chamber is fluidly coupled to said eductor chamber.

8. The water conditioner valve as recited in claim 1, wherein said working portion includes a hard water inlet, a hard water outlet, a soft water outlet and a brine port.

9. The water conditioner valve as recited in claim 7, further including a main piston with a piston rod located in said main valve chamber, and a supplemental piston with a supplemental piston rod in said second valve chamber.

10. The water conditioner valve as recited in claim 9, wherein said first and second valve chambers are further configured to receive said pistons in various selected positions to provide selective fluid communication for a service cycle, a backwash cycle, and a brine cycle.

11. The water conditioner valve as recited in claim 1, further including a main piston located in said main valve chamber, wherein said main piston includes a plurality of seals for selective fluid communication between a plurality of ports.

12. A water conditioner valve configured for use with a tank in a water conditioning system, the tank having an opening for receiving the valve, said valve comprising:
   a main housing having a formation configured for abutting an opening in the tank, a substantial portion of said main housing being disposed below said formation and inside the tank;
   said main housing having a plurality of ports disposed below said formation and inside the tank;
   a working portion within said main housing including first and second valve chambers;
   a main piston mounted for reciprocal movement in said first valve chamber and a supplemental piston mounted for reciprocal movement in said second valve chamber, said main and supplemental pistons moving between a plurality of positions to provide selective fluid communication between a plurality of locations in said first valve chamber;
   wherein a major portion of said first valve chamber is mounted below said formation and inside the tank; and
   wherein a portion of said second valve chamber is located below said formation and inside the tank.

13. A combination of a water conditioner valve and a treatment tank, comprising:
   a tank;
   a main housing configured for providing fluid communication between a plurality of ports connected to water conditioning-related locations, and having a formation configured for abutting an opening in said tank;
   a substantial portion of said main housing being disposed below said formation and inside said tank;
   a substantial number of said ports being disposed below said formation and inside said tank;
   a working portion within said main housing including first and second valve chambers, wherein a major portion of said first valve chamber is mounted below said formation and inside said tank, and wherein a portion of said second valve chamber is located below said formation and inside said tank;
   a main piston mounted for reciprocal movement in said first valve chamber and including a main piston rod;
   a supplemental piston mounted for reciprocal movement in said second valve chamber and including a supplemental piston rod; and
   a portion of said working portion having a threaded circumference for fastening to said tank, said working portion being in fluid communication with said tank.

14. The combination recited in claim 13, wherein said tank includes an upper end defining a flange and wherein said portion of said working portion located within said tank is disposed below said flange.

15. The combination recited in claim 13, wherein each of said first and second valve chambers has a longitudinal axis, and said longitudinal axes of said first and second valve chambers are vertically oriented.

16. The combination recited in claim 13, wherein said flange defines an opening, and said working portion located within said tank is configured to fit within said opening.

* * * * *